United States Patent
Mayer-Ullmann (10) Patent No.: US 7,827,486 B2
(45) Date of Patent: Nov. 2, 2010

(54) EVALUATION OF VISUAL CONTENT USAGE

(75) Inventor: Dietrich Mayer-Ullmann, Ilvvesheim (DE)

(73) Assignee: SAP AG, Walldorf (DE)

( * ) Notice: Subject to any disclaimer, the term of this patent is extended or adjusted under 35 U.S.C. 154(b) by 387 days.

(21) Appl. No.: 11/701,233

(22) Filed: Feb. 1, 2007

(65) Prior Publication Data

US 2008/0186276 A1    Aug. 7, 2008

(51) Int. Cl.
*G06F 3/00*    (2006.01)

(52) U.S. Cl. .............. 715/704; 715/764; 715/789

(58) Field of Classification Search ........... 715/764, 715/704, 789
See application file for complete search history.

(56) References Cited

U.S. PATENT DOCUMENTS

| | | | |
|---|---|---|---|
| 2002/0144233 A1* | 10/2002 | Chong et al. | 717/105 |
| 2004/0261026 A1* | 12/2004 | Corson | 715/704 |
| 2006/0010420 A1* | 1/2006 | Peterson et al. | 717/106 |
| 2009/0037814 A1* | 2/2009 | McLean | 715/704 |

* cited by examiner

*Primary Examiner*—Dennis Bonshock
(74) *Attorney, Agent, or Firm*—Brake Hughes Bellermann LLP (57) ABSTRACT

A method may include determining a plurality of sets of interaction events, each set of interaction events associated with a use of a user interface. Determining common interaction events among the sets. Determining a common interaction path including an ordered sequence of the common interaction events. Providing a simulation associated with the common interaction path including rendering the common interaction events in the ordered sequence.

18 Claims, 5 Drawing Sheets

| 320 | 330 | 310A | 310B | 310C | 310D |
|---|---|---|---|---|---|
| Event | Compliance | User 1, 3 | User 2 | User 5 | User 4, 6, 7 |
| 1. | 57% | Mouse movement to button | Mouse movement to button | Mouse movement to button | Key "Tab" press |
| 2. | 57% | Mouse click on button | Mouse click on button | Mouse click on button | Key "Tab" press |
| 3. | 100% | Screen change | Screen change | Screen change | Key "Tab" press |
| 4. | 79% | Mouse move to input field | | | Key "Enter" press |
| 5. | 43% | Device change | | Device change | Screen change |
| 6. | 86% | Key "h" press | | Key "h" press | Key "h" press |
| 7. | 86% | Key "e" press | | Key "e" press | Key "e" press |
| 8. | 86% | Key "l" press | | Key "l" press | Key "l" press |
| 9. | 86% | Key "l" press | | Key "l" press | Key "l" press |
| 10. | 86% | Key "o" press | | Key "o" press | Key "o" press |
| 11. | 43% | Device Change | | Device Change | Key "Tab" press |
| 12. | 43% | Mouse move to button | | Mouse move to button | Key "Tab" press |
| 13. | 100% | Mouse click on button | Mouse click on button | Mouse click on button | Key "Enter" press |
| 14. | 100% | Windows close | Windows close | Windows close | Windows close |

340 Connector

EVALUATION OF VISUAL CONTENT USAGE

TECHNICAL FIELD

This description relates to evaluation of visual content usage.

BACKGROUND

Graphical user interfaces (GUIs), while less common in the early days of computing, have become common place among computing applications. GUIs allow users to operate an underlying program, application or other system to accomplish some task or set of tasks through interactions with one or more visual components of the GUIs. The interactions may include, for example, clicking a button or entering text on the GUI.

Over time, a GUI may be created, modified, or updated to reflect additional functionality associated with an underlying system, or the GUI may be redesigned without additional system functionality. But regardless of whether or not the underlying system changes, modifications to a GUI can have a profound and sometimes unexpected or even undesirable impact on the ways users interact with the system and/or GUI.

To determine, for example, the impact of a created or modified GUI, or to gauge the efficacy of an existing GUI, an administrator may want to evaluate how different users use the GUI. But for as many users who interact with the GUI, there may exist as many different user experiences. However, over a number of different user experiences, while there may still exist differences among the experiences, there may also exist some overlap or similarities as well. Such overlap may include, for example, a common interaction performed by two or more users while trying to accomplish similar tasks (i.e. clicking on the same button on the GUI, using a mouse).

However, it may be difficult and time-intensive for a single, or even a team of administrator(s) to personally or manually administer and review the experiences of several users, and to try to determine similarities and/or differences in the users' experiences. This task may become even more difficult, where there are a large number of users interacting with a GUI whose experiences need to be evaluated.

SUMMARY

According to an example embodiment, a method is disclosed. A plurality of sets of interaction events may be determined, each set of interaction events associated with a use of a user interface. Common interaction events among the sets may be determined. A common interaction path including an ordered sequence of the common interaction events may be determined. A simulation associated with the common interaction path including rendering the common interaction events in the ordered sequence may be provided.

According to another example embodiment a system is disclosed. The system may include an event recorder configured to record interaction events associated with a use of a user interface by one or more users. The system may also include an aggregator configured to aggregate at least some of the interaction events associated with one or more of the users. The system may also include a path detector configured to determine one or more common interaction paths based on common interaction events associated with the aggregated interaction events. The system may also include a simulator configured to render visual representations of the one or more common interaction paths with respect to the user interface.

According to another example embodiment, a computer program product is disclosed. The computer program product may be tangibly embodied on a computer-readable medium and may include executable code that, when executed, is configured to cause a data processing apparatus to determine interaction events associated with one or more uses of a user interface by one or more users based on one or more tasks associated with the user interface, aggregate a selection of the interaction events, determine common interaction events associated with one or more of the users based on the aggregated interaction events and determine one or more common interaction paths based on the common interaction events.

The details of one or more implementations are set forth in the accompanying drawings and the description below. Other features will be apparent from the description and drawings, and from the claims.

DETAILED DESCRIPTION

Figure 1:
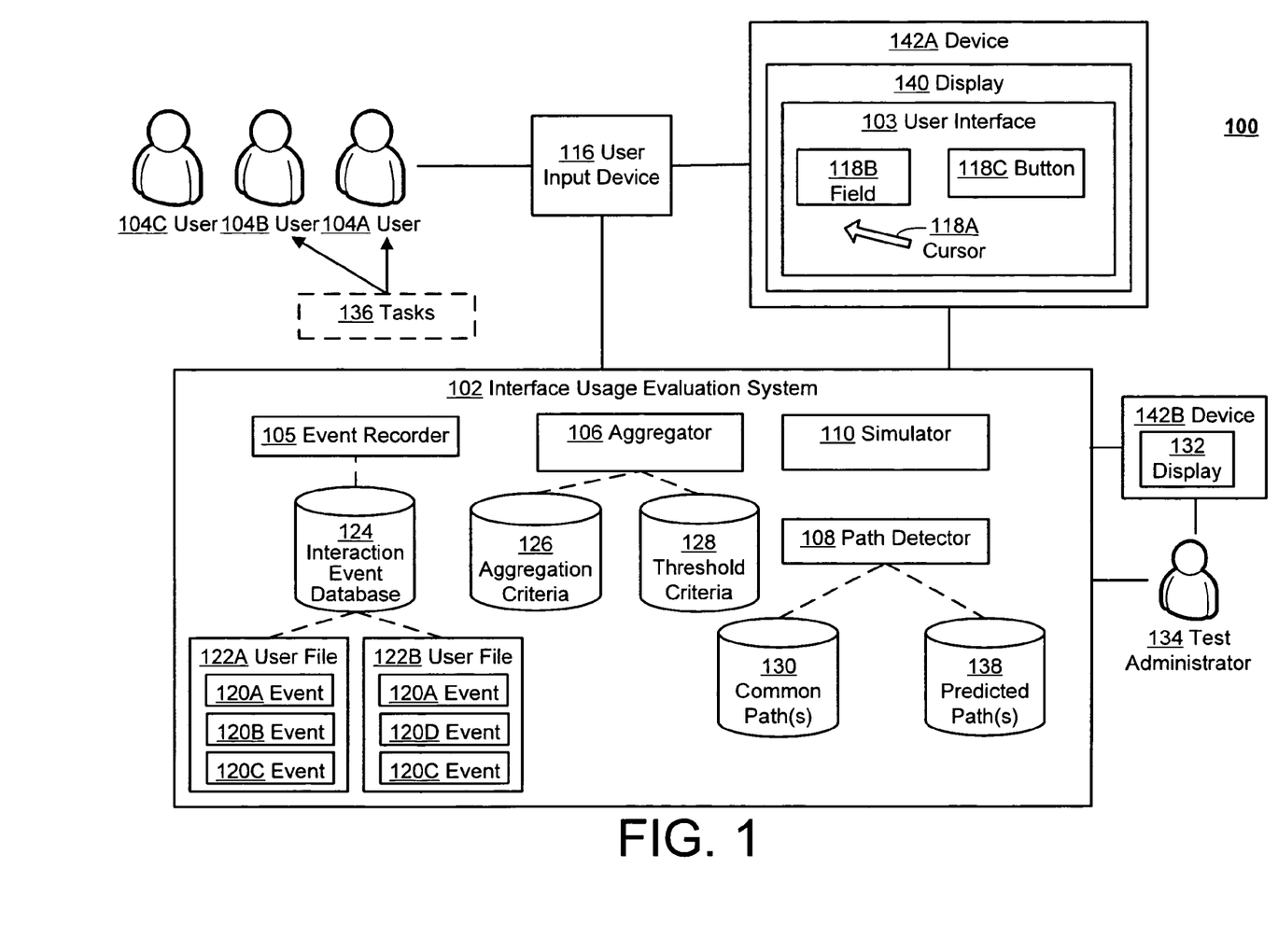
FIG. 1 is a block diagram of an example system using an interface usage evaluation system, according to an example embodiment.

FIG. 1 is a block diagram of an example system 100 using an interface usage evaluation system 102, according to an example embodiment. In the example of FIG. 1, the system 100 allows for rapid review of a number of visual recordings of user actions, such as, for example, a series or sequence of user interactions with an application and/or a graphical user interface. As referenced above, such user interactions may include virtually any usage or other interaction with an application or graphical user interface, including, for example, a selection of a field or other element, a movement of a screen element, or a selection or entry of strings of text. As a result, the system 100 may be used to quickly review similarities and/or differences between an aggregation of uses (i.e. a grouping of user interactions) by one or more groups of users, including one or more simulations thereof, thus avoiding the need to literally or metaphorically look over the shoulder of each user as the user interacts with (i.e. uses) the application and/or graphical user interface.

A usage of an application or graphical user interface may include multiple user interactions. An individual instance of each such user interaction may be referred to as an interaction event, and a series or sequence of interaction events, together, may define an interaction path that represents a user experience or usage of the application or graphical user interface, e.g., with a specific task(s), instance, or implementation thereof. For example, a graphical user interface may include a website offering a number of products for sale. Then for example, the system 100 may track users as they browse through the items and select one or more items to purchase. As the users view, browse and/or purchase different items on the website each mouse and/or keyboard interaction with the website may be recorded as an interaction event. Then for example, each user's complete experience, for example from logging onto the website to logging out or purchasing items, may include a sequence of interaction events (i.e. an interaction path) as performed by the user.

Also as referenced above, such interaction events (and resulting interaction paths) may be recorded, for the purposes of, for example, usability testing of the application or interface in question, where such usability testing may be performed with respect to a relatively large number of users. In continuing the website example above, one or more features the website may have been redesigned, and thus user's interactions with the website may be recorded to determine what effect the new design may have on the usability of the website.

In the example of FIG. 1, the interface usage evaluation system 102 may be configured to aggregate or summarize the results of such usability testing across the large number of users, and may be configured to output an aggregated simulation thereof. Such an aggregated simulation may allow for quick and easy viewing of the results of the usability tests, as well as for making a determination of how the application or interface was used (whether successfully or unsuccessfully), without having to individually and/or manually analyze each use of the test results of each user. Further, the simulation may easily be compared to an expected or idealized path or sequence of interaction events (i.e. how the application or interface was designed or otherwise anticipated to be used) to determine what variances may exist between the two. In these examples, then, and based on the comparison(s), it may be determined whether the application or interface is successful, or, conversely, needs to be redesigned.

As just referenced, then, the interface usage evaluation system 102 may include one or more of a system, application, device or other grouping of components configured to determine one or more sequences of common interaction events among multiple instances, implementations, or other uses of an application or interface. For example, the interface usage evaluation system 102 may record or otherwise determine interaction events associated with one or more uses of a user interface 103. Then, from the recordings, the interface usage evaluation system 102 may determine interaction events that are common among a selection or subset of the instances, implementations, or other uses of the user interface 103. From the common interaction events, the interface usage evaluation system 102 may determine one or more sequences of the common interaction events (e.g., common interaction paths) as performed during the uses, and may thereafter provide a simulation (or simulations) of the common interaction path(s).

The user interface 103 may include an interface whereby users may interact with an application or other system. For example, the user interface 103 may include a web site (including one or more web pages), a video game, a menu screen for a video display device, a graphical user interface associated with a program, or other interface.

According to an example embodiment, the user interface 103 may be an updated or modified version of an earlier user interface (not shown). The user interface 103 may then be provided in conjunction with the interface usage evaluation system 102 to determine the effects of the modifications to the earlier user interface. In another example embodiment, the user interface 103 may have undergone, may be undergoing, or may potentially undergo a redesign, wherein an effectiveness of the user interface 103 during one or more uses, based at least in part on the interaction events recorded during the uses, may help determine the outcome of the redesign. Examples of the effectiveness may include determining design flaws, broken functionality and/or other bugs associated with the user interface 103.

In the example of FIG. 1, users 104A, 104B and 104C may represent and include users of the user interface 103. The users 104A-C may include anyone who may operate or interact with the user interface 103. For example, the user 104A may be a tester who performs usability testing on the user interface 103, the user 104B may be a beta-client who has agreed to use the user interface 103 and provide feedback on its design, and the user 104C may be an end-user who interacts with the user interface 103 to perform one or more functions. In another example embodiment, the users 104A-C may include one or more automated systems configured to interact with the user interface 103.

In the interface usage evaluation system 102, an event recorder 105 may record or otherwise determine interaction events occurring during one or more uses of the user interface 103. For example, a user 104A (i.e. a tester) may be provided multiple features of the user interface 103 which are to be tested. Then, during the testing, the event recorder 105 may monitor and record the performance of the user 104A on the user interface 103. Then, for example, during the performance, the event recorder 105 may continually or periodically record or determine status information, i.e. interaction events, associated with the user 104A's use of the user interface 103. For example, the event recorder 105 may record the position of a pointer, keystrokes entered by the user 104A, the features of the user interface 103 with which the user 104A interacted and/or how those features responded to the interactions.

An aggregator 106 may aggregate or otherwise group interaction events determined from the one or more uses of the user interface 103. For example, the aggregator 106 may aggregate some or all of the interaction events as recorded by the event recorder 105. For example, the aggregator 106 may group or aggregate the interaction events based on commonalities (e.g. common interaction events) among the one or more uses of the user interface 103. For example, the event recorder 105 may record interaction events associated with five uses (e.g. by five different users 104A-C) of the user interface 103 (i.e. for example the website as discussed above). Then, for example, the first, second and fifth use may include three interaction events including a mouse click on a first button, a mouse click on a second button and a keyboard entry of the letter "a." The third and fourth uses may also include three interaction events which may include for example, a mouse click on the second button, a keyboard entry of the letter "a" and a mouse click on a third button. Then for example, the aggregator 106 may group the five uses based on common interaction events, wherein the first group may include the first, second and fifth uses and the second group includes the third and fourth uses.

A path detector 108 may determine one or more common sequences of interaction events based on one or more uses of the user interface 103. For example, the path detector 108 may first determine common interaction events from one or more aggregated or grouped interaction events. Then for example, based on the aggregation of the interaction events by the aggregator 106, the path detector 108 may determine which of the interaction events are considered to be common over a selection of the uses. For example, the path detector 108 may determine that only those interaction events performed during a majority of the uses qualify as common interaction events. In continuing the example above, the path detector 108 may determine that of the two aggregated groups the common interaction events include only the 'mouse click on the second button' and 'keyboard entry of the letter "a"' as they were included in all of the uses.

In other example embodiments, the path detector 108 may have different criteria for determining which interaction events may qualify as common interaction events. For example, it may be that interaction events included in a majority of the uses may qualify as common, in which case, in continuing the example above, the common events may also include the 'mouse click on a first button' interaction event in addition to the 'mouse click on the second button' and 'keyboard entry of the letter "a"' interaction events since they were performed during a majority of the uses.

The path detector 108 may then determine one or more common interaction paths associated with the uses of the user interface 103, based on the one or more common interaction events. In continuing the above example, having determined the common interaction events include the 'mouse click on the second button' and 'keyboard entry of the letter "a"' interaction events for example, the path detector 108 may then sequence the common interaction events to determine one or more common interaction paths. For example, the path detector 108 may sequence the events based on the order in which they were recorded or determined by the event recorder 105, i.e., a common interaction path may include the 'keyboard entry of the letter "a"' interaction events in that order. Other example embodiments may order or sequence the common interaction events as one or more common interaction path(s) based on different criteria.

A simulator 110 may simulate one or more common interaction paths associated with one or more uses of the user interface 103. For example, the simulator 110 may provide a simulation of the common interaction path(s) as determined by the path detector 108. The simulator 110 may, for example, plot or perform the common interaction events in the sequence as provided by the common interaction path, on the user interface 103. The simulator 110 may then, for example, provide a representation of the user interface 103, including a performance of the common interaction events in a sequential or chronological order.

The simulation as provided by the simulator 110, may include a simulation of interactions with the user interface 103, as provided by a user (e.g. 104A-C) via a user input device 116. The user input device 116 may include any device configured to allow a user (e.g. 104A-C) to interact with the user interface 103. For example, the user input device 116 may include a keyboard, mouse, joystick, stylus, pointer, remote control, or other device. For example, the user 104A may provide input to the user interface 103 by typing on a keyboard (e.g. 116).

The user input device 116 may enable the users 104A-C to interact with one or more user interface components 118A, 118B and 118C associated with the user interface 103. The user interface components 118A-C may include components of the user interface 103 configured to provide output to and/or receive input from the users 104A-C. Example user interface components may include a cursor 118A, a field 118B, and a button 118C. In other example embodiments, the user interface 103 may include or be associated with additional and/or different user interface components (e.g. 118A-C).

The cursor 118A may include a pointer or other visual indicator appearing on the user interface 103 and operable via the user input device 116. For example, the cursor 118A may be associated with a mouse (e.g. 116), wherein the user 104B may move the cursor 118A about the user interface 103 and interact with other user interface components (e.g., the field 1181B and button 118C) via the mouse. For example, the user 104A may use the mouse to click in the field 118B, or on the button 118C.

The field 118B may include a text input box, menu, radio buttons, check boxes, or other field(s) or icons configured to receive input from and/or provide output to a user (e.g. 104A-C). For example, the user 104B may use a keyboard (e.g. user input device 116) to type text into the field 118B. In another example embodiment, the user 104C may use a mouse (e.g. user input device 116) to move the cursor 118A to select a radio button or drop down menu option from the field 118B.

The button 118C may include a selectable graphical icon on the user interface 103. For example, the button 118C may be selectable by a user (e.g. 104A-C) with the user input device 116. The button 118C may be associated with the performance of some functionality associated with the user interface 103. For example, the button 118C may include a 'submit' button whereby a selection of the button 118C may trigger the processing of information provided by the users 104A-C to the user interface 103. In another example embodiment, the button 118C may allow a user (e.g. 104A-C) to browse through multiple screens associated with the user interface 103.

The event recorder 105 may record one or more uses of the user interface 103 by the users 104A-C, determine interaction events associated with the uses and store the recorded interaction events as events 120A, 120B, 120C, and 120D. The events 120A-D may include interaction events occurring between the users 104A-C and the user interface 103 as captured or determined by the event recorder 105. For example, the user 104A may use a mouse (e.g. 116) to move the cursor 118A on the user interface 103, click on the field 118B, and type with a keyboard (e.g. 116) the letter 'h'. Then for example, the event recorder 105 may determine the event 120A to include the movement of the cursor 118A to the field 118B, the event 120B to include the click on the field 118B, and the event 120C to include typing of the letter 'h'. In another example embodiment, the event recorder 105 may only determine two events (e.g. 120B and 120C) the clicking on the field 1188B and the typing of the letter 'h'. In another example, the event recorder 105 may only determine a single event (e.g. 120C) as the typing of the letter 'h' in the field 118B. The events 120A-D may also include, for example, an indication of the time taken to perform each event and/or the sequence in which the events were performed or recorded.

The events 120A-D may include status information associated with user input device 116 and/or the user interface 103 (including the user interface components 118A-C). For example, the event recorder 105 may periodically (every 0.2 seconds for example) record the location of the cursor 118A on the user interface 103 and whether anything has been input into the field 118B. Then, for example, even if a user (e.g. 104A-C) does not perform a new interaction with the user interface 103, an event (e.g. 120A-D) may be recorded signifying no change in the status (and/or the current status) of the user input device 116 and/or the user interface 103.

In another example embodiment, the event recorder 105 may record the events (e.g. 120A-D) when a user (e.g. 104A-C) interacts with the user interface 103 and/or the user input device 116. For example, the user 104A may move a mouse (e.g. 116), wait several minutes, and then type on a keyboard (e.g. 116). Then for example, the event recorder 105 may record the event 120A for the mouse movement, the event 120B for the keyboard type, but no event for the several minutes in between.

The event recorder 105, according to another example embodiment, may record specific events and the time taken to perform those events. For example, the event recorder 105 may be focused on interactions via a keyboard (e.g. 116). Then for example, the user 104B may use a mouse (e.g. 116)

to click on several locations on the user interface 103 with the cursor 118A, may type on a keyboard (e.g. 116) 'hello' in the field 118B and may make select the button 118C on the user interface 103 with the mouse. The event recorder 105 may then for example record a single event (e.g. 120A-D) including the typing of 'hello' and may include the time it took the user 104B to type the entire word, or five events each one of which may be associated with each letter of 'hello' and the time taken to input each individual letter.

The events 120A-D may be grouped into user files 122A and 122B. The user files 122A and 122B may include one or more of the events 120A-D associated with a particular user (e.g. 104A-C), use and/or user interface 103. For example, the user file 122A may include the events 120A, 120B and 120C associated with a use of the user interface 103 by the user 104A and the user file 122B may include the events 120A, 120D and 120C associated with a use of the user interface 103 by the user 104B. In another example embodiment, the user file 122A may include the events 120A, 120B and 120C associated with a use of a first user interface 103 by the user 104B, and the user file 122B may include the events 120A, 120B and 120C associated with a use of a second user interface (not shown) by the user 104B. In another example embodiment, the user file 122A may include the events 120A, 120B and 120C associated with a first use of the user interface 103 by the user 104C and the user file 122B may include the events 120A, 120D and 120C associated with a second use of the user interface 103 by the user 104C.

The user files 122A and 122B may be stored in an interaction event database 124. The interaction event database 124 may include user files (e.g. 122A, 122B) and/or events (e.g. 120A-D) associated with one or more uses of a user interface (e.g. 103). For example, the interaction event database 124 may include the user files 122A and 122B, including the events 120A-D associated with the user interface 103.

The aggregator 106 may aggregate information from the interaction event database 124 based on aggregation criteria 126. The aggregation criteria 126 may include criteria or values associated with one or more of the user files 122A, 122B and/or the events 120A-D by which to determine which of the user files 122A, 122B and/or events 120A-D to aggregate. For example, the interaction event database 124 may include a user file (e.g. 122A, 122B) associated with each of the users (e.g. 104A, 104B, 104C) for each of two use dates of the user interface 103, i.e. six user files. Then, for example, the aggregation criteria 126 may specify that only the user files associated with the users 104A and 104B on the second use date be aggregated. In another example embodiment, the aggregation criteria 126 may specify that only the user files from the first use date be aggregated. In another example embodiment, the aggregation criteria 126 may not specify any criteria or may specify criteria broad enough wherein all of the events from all of the user files from both test dates associated with all of the users may be aggregated.

In another example embodiment, the interface usage evaluation system 102 may be associated with multiple user interfaces (e.g. 103). Then for example, the aggregation criteria 126 may specify which data (from the interaction event database 124) associated with which user interface 103 to aggregate. The aggregation criteria 126 may further specify, as discussed above, which sub-data (i.e. which users, dates, uses, etc.) of the user interface data to aggregate.

The path detector 108, based on threshold criteria 128, may determine one or more common events from the aggregated data (as aggregated by the aggregator 106) associated with at least a selection of the uses of the user interface 103 by the users 104A-C. The threshold criteria 128 may include a value or values associated with determining one or more common event(s) (i.e. common interaction event(s)) from the aggregated data. The threshold criteria 128 may include, for example, a percentage of how many users (e.g. 104A-C) an event (e.g. 120A-D) must have been performed by to be considered a common event. For example, the event recorder 105 may have recorded a use of the user interface 103 by each of the ten users (e.g. 104A-C). The aggregator 106 may aggregate the events (e.g. 120A-D) recorded by the event recorder 105 and determine that eight different events were performed by some combination of one or more of the ten users. The threshold criteria 128 may indicate a value of 70% for a common event. Then for example, the path detector 108 may determine (from the aggregated data) that of the eight different events, only the first, second, fourth, fifth and eighth events were performed by seven or more of the users, wherein the remaining events (i.e. the third, sixth and seventh events) were performed by less than 70% of the users. The path detector 108, based on the threshold 128, may then determine the common events to include the first, second, fourth, fifth and eighth events.

In another example embodiment, the order in which the events (e.g. 120A-D) occurred may determine which events are included as common events. For example, the user 104A may be associated with events including a first mouse click, a keyboard stroke of the letter 'a,' a second mouse click, a second keyboard stroke of the letter 'b' and a third keyboard stroke of the letter 'c'. The user 104B then for example may be associated with events including a first mouse click, a keyboard stroke of the letter 'a,' a second keyboard stroke of the letter 'b', a third keyboard stroke of the letter 'c', and a second mouse click. Then for example, the path detector 108 may only be concerned about consecutive keyboard strokes occurring, as performed by a majority of the users. Thus, the path detector 108 may determine that only the keyboard stroke of the letter 'b' and the keyboard stroke of the letter 'c' are common events.

The path detector 108 may then determine common path(s) 130 based on a sequencing or other ordering of common events (i.e. common interaction events). For example, in continuing the example above wherein events (e.g. 120A-D) associated with the ten users were recorded, the path detector 108 determined the common events to include the first, second, fourth, fifth and eighth events. Then for example, to determine a common path 130 (i.e. common interaction path), the path detector 108 may sequence the common events. For example, the common events may be sequenced by the event occurring most often among the users to the event occurring least often. Then, for example, the path detector 108 may determine that a common path 130 includes the second, first, fifth, fourth and eighth events (in that order).

In another example embodiment, the path detector 108 may sequence the events in the chronological order in which they were detected (by the event recorder 105), i.e., first, second, fourth, fifth and eighth events. In other example embodiments, the path detector 108 may sequence events based on other criteria as well to determine additional common path(s) 130.

The simulator 110 may then provide a display 132 of a simulation of one or more of the common path(s) 130. The display 132 may include a simulation or other visual representation of one or more of the common path(s) 130. For example, the display 132 may include a simulation of a performance the events (e.g. 120A-D) associated with the common path(s) 130 on the user interface 103.

A test administrator 134 may view the simulation on the display 132. The test administrator 134 may be able to quickly view, on the display 132, one or more common path(s) 130 representing a selection of the most common uses of the user interface 103 without having to manually analyze or administer each use. The test administrator 134 may, for example, determine which aggregation criteria 126 and/or threshold criteria 128 to use to determine the common path(s) 130. The test administrator 134 may then be able to quickly determine, for example, whether the common path(s) 130 correlate to how the test administrator 134 may have anticipated the user interface 103 to be used.

According to an example embodiment, the users (e.g. 104A-B) may perform tasks 136 with the user interface 103. The tasks 136 may include one or more tasks or functions a user (e.g. 104A-B) may be asked to perform by using the user interface 103. The tasks 136 may, for example, focus a user's use of the user interface 103, and/or on one or more features of the user interface 103 which may be of interest to the test administrator 134.

For example, as discussed above, the user interface 103 may include a newer or modified version of an older user interface. For example, the user interface 103 may include the button 118C (a feature not included on the older user interface). Then for example, the tasks 136 may include one or more tasks associated with a selection or use of the button 118C, perhaps as part of a larger sequence of interaction events.

Predicted path(s) 138 may include one or more paths, sequences or set of events (e.g., common interaction events) associated with a predicted or anticipated use of the user interface 103. For example, the predicted path(s) 138 may include a particular sequence of interaction events (e.g. 120A-D) associated with the tasks 136. Then, for example, the test administrator 134 may be able to compare, via the display 132, a simulation (as provided by the simulator 110) of the common path(s) 130 versus the predicted path(s) 138.

For example, the button 118C may be included in the user interface 103 (wherein the button 118C was not included in an earlier version of the user interface 103), the test administrator 134 may provide a predicted path(s) 138 including a use of a mouse (e.g. 116) to click on the button 118C. Then for example, one hundred users (e.g., represented by the users 104A-C) may perform the tasks 136 associated with the button 118C, whereby 90% of the users use a keyboard (e.g. 116) to select the button 118C, and only 10% use a mouse (e.g. 116). Then, for example, the simulator 110 may provide, via the display 132, a simulation of the predicted path(s) 138 including a mouse selection of the button 118C and a simulation of the common path(s) 130 including a keyboard selection of the button 118C. The test administrator 134 may then be able to quickly determine the differences between the predicted path(s) 138 and the common path(s) 130, and adjust the user interface 103 accordingly.

In continuing the website example as discussed above, the website (e.g. user interface 103) may have been redesigned. Then, the users (e.g. 104A-C) may use or interact with the website to browse through merchandise for sale and/or purchase items based on the tasks 136 for example. The interface usage evaluation system 102 may determine the common events among the users and then the common path(s) 130. The test administrator 134 may then view simulation(s) of the common path(s) 130, reflecting how the users actually used the website, and compare it against simulation(s) of the one or more of the predicted path(s) 138, reflecting how the test administrator 134 may have anticipated the website being used. Then based on the comparison, the test administrator 134 may be able to determine whether and how the website should be redesigned.

The user interface may be provided on a display 140. The display 140 may be configured to display user interface 103. For example, the display 140 may include a monitor, television, liquid crystal display, or other screen or display on which the user interface 103 may be provided.

The devices 142A and 142B may be associated with the display 140 and the display 132, respectively. The devices 142A and 142B may include, for example, laptop computers, desktop computers, servers, televisions, personal digital assistants (PDAs), mobile phones or other electronic devices.

Using the system 100 of FIG. 1, then, the test administrator 134 may quickly and easily determine how a large number of users (e.g. 104A-C) interacted with or used the user interface 103, without having to personally administer and/or review the performances by each of the users. This may in turn allow the test administrator 134 to report results to management or other associates to determine how to adjust (or further adjust) the user interface 103 based on the performances by actual users. Further, such improvements may allow new and/or improved user interfaces (e.g. 103) to be provided to users (e.g. 104A-C) in a much more cost-effective and timely manner than if the test administrator 134 had to manually analyze and/or administer each of the performances.

Figure 2:
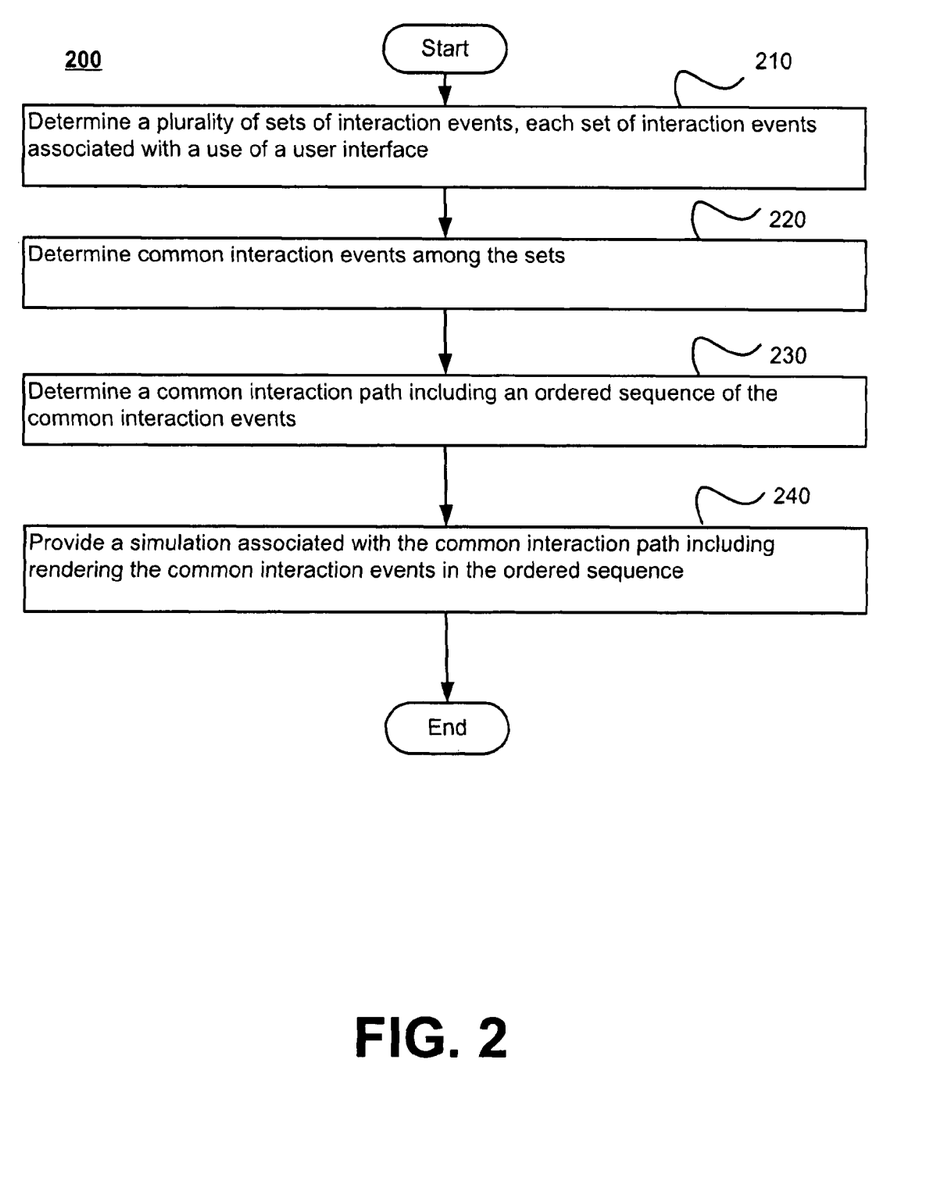
FIG. 2 is a flowchart illustrating example operations of the system of FIG. 1.

FIG. 2 is a flowchart 200 illustrating example operations of the system of FIG. 1. More specifically, FIG. 2 illustrates an operational flow 200 representing example operations related to the evaluation of interface usage.

After a start operation, a plurality of sets of interaction events may be determined, where each set of interaction events may be associated with a use of a user interface (210). For example, as shown in FIG. 1, the event recorder 105 may record uses of the user interface 103 by the users 104A and 104B. Then, for example, the event recorder 105 may store the events 120A-D captured during the uses by the users 104A and 104B in the user files 122A and 122B, respectively. The user files 122A and 122B may then be stored in the interaction event database 124.

Then, common interaction events among the sets may be determined (220). For example, the aggregator 106 may aggregate the user files 122A and 122B based on the aggregation criteria 126. The path detector 108 may then, based on the threshold criteria 128, determine from the aggregated data, which of the events 120A-D are common among the user files 122A and 122B. The path detector 108 may, for example, determine that event 120A and 120C are common interaction events.

Then, a common interaction path including an ordered sequence of the common interaction events may be determined (230). For example, the path detector 108 may determine one or more common path(s) 130 based on the common events (i.e. events 120A and 120C). The path detector 108 may order or sequence the common events, for example in the order recorded, and store the ordered sequence as common path(s) 130.

Then, a simulation associated with the common interaction path including rendering the common interaction events in the ordered sequence may be provided (240). For example, the simulator 110 may simulate the common path(s) 130 on the user interface 103 via the display 132. Then, for example, the test administrator 134 may quickly view the simulation of the common path(s) 130 without having had to analyze each of the user's 104A-C uses individually.

Figure 3:
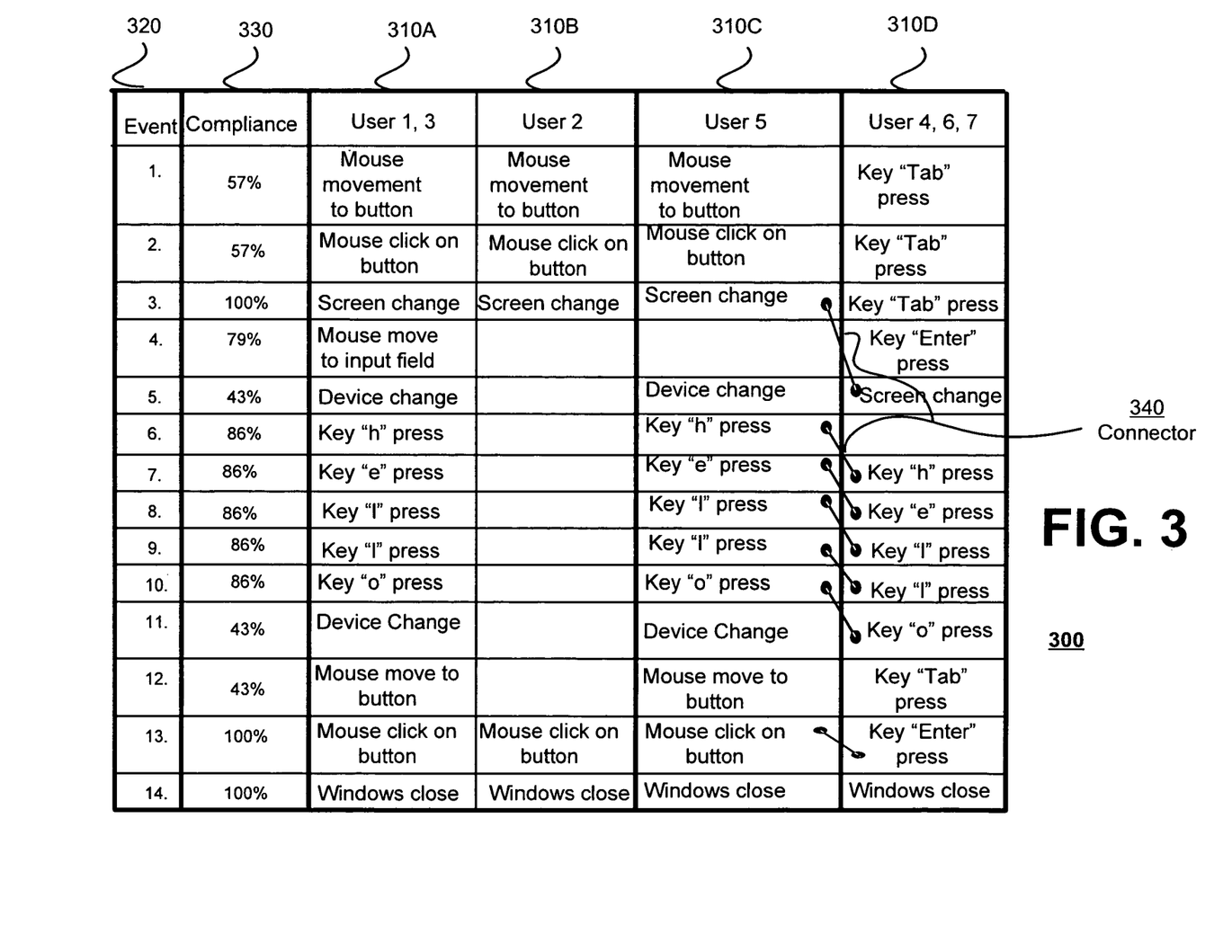
FIG. 3 is a block diagram of an example aggregation of interface usage data, according to an example embodiment.

FIG. 3 is a block diagram of an example aggregation 300 of interface usage data, according to an example embodiment. In the example of FIG. 3, the aggregation 300 may include aggregated data associated with a use of a user interface by seven different users. In the example of FIG. 3, each of the seven users may have been provided a task or list of tasks to accomplish using the user interface, which may have been redesigned and which may need to undergo usability testing by the seven users. Then, for example, the data recorded (e.g., by the event recorder 105) during the performance of the tasks may have been aggregated (by an aggregator) based on similarities among the seven uses, i.e., common events occurring during the uses, thus resulting in the example aggregation 300.

The aggregation 300 may include columns 310A, 3101B, 310C and 310D. The columns 310A-D may each include aggregated data associated with one or more of the users who used a user interface. For example, the column 310A may include the events performed by both the user 1 and user 3, because user 1 and user 3 may have performed the same events in the same order or sequence. Then for example, the columns 310B and 310C may include the events performed by each of user 2 and user 5, respectively, each of whom may have performed events different from the remaining other users. Then for example, the column 310D may include the events performed by user 4, user 6 and user 7, each of whom may have performed the same events (in the same sequence or order).

A column 320 'event' may correspond to events captured during one or more uses of a user interface. For example, the seven users may have performed a combined total of 14 different events (i.e. interaction events) captured by the event recorder. For example, the first event as performed by the users 1, 3, 2 and 5 may include "Mouse movement to button" (as determined from the columns 310A, 310B and 310C), while the first event as performed by the users 4, 6, and 7 (as determined from the column 310D) may include "Key "Tab" press."

The event 4 of column 310B of is empty. This may indicate that during the recording of event 4 (by the event recorder), that the user 2 performed no action with respect to the user interface. For example, events 4-12 of column 310B are empty. Thus, this may indicate for example that user 2 may have left the user interface to go to the restroom, perhaps fallen asleep or simply sat there and did nothing during the recording of events 4-12. According to an example embodiment, an additional camera may have been set up to record user 2 during the performance of the tasks with the user interface. Then, for example, a test administrator may review the camera video for user 2 to determine more precisely what happened during the events 4-12. Or in another example embodiment, the test administrator may question user 2 to determine what happened during the events 4-12, and the test administrator may determine whether or not to exclude the results of the performance by user 2 from updated version of the aggregation 300.

Column 330 'compliance' may thus indicate, for each of the events of column 320, how many users performed the particular event. For example, event 14 has a compliance rate of 100% indicating that every user whose data was analyzed and/or aggregated performed event 14. Thus, looking at the columns 310A-D, each event 14 includes the "Windows close" event. Event 1 includes a 57% compliance (from column 330), whereby while users 1,3, 2, and 5 each performed the "Mouse movement to button" event, the users 4, 6 and 7 performed a different event "Key "Tab" press" thus resulting in the 57% compliance.

Event 3 includes a compliance of 100%, however while event 3 of users 1, 3, 2 and 5 include "Screen change," event 3 of column 310D includes "Key "Tab" press." This is because of connector 340 connects the event 3 of column 310C "Screen change" to the event 5 of column 310D. The connector 340 may be used to indicate similar or common events which may have been performed by one or more users in a different sequence or order. For example, the user interface associated with the aggregation 300 may include more than one way to reach the 'screen change' event. For example, a first way may include performing a "mouse movement to button" event followed by a "mouse click on button" event, as performed by the users 1, 3, 2 and 5. A second way may include pressing the "Tab" key three times and pressing the "enter" button, as performed by the users 4, 6 and 7. Then for example, an aggregator may be able to determine the similarities between the event 5 of column 310D and the event 3 of columns 310A, 310B and 310C and associate the events via a connector 340. Additional connectors associate events 6-10 of column 310C to events 7-11 of column 310D. In alternative embodiments, there may have existed other alternative sequences of events to reach the 'Screen change,' that may have not been performed by any user, or not by any of the users whose data was used in the aggregation 300.

Another connector 340 may connect event 13 of column 310C to event 13 of column 310D. The connector 340 connecting the two event 13s "Mouse click on button" and "Key "Enter" press" may associate the two events based upon a determination that the two interactions are similar enough to be considered the same event. For example, a test administrator may determine that he does not care whether a user clicks on a button with a mouse or presses enter to close a window. Then for example, the aggregator may receive this instruction from the test administrator and may associate the event 13s and determine the compliance of event 13 as 100%.

A path detector may, based on the aggregation 300, then determine common events associated with the performance of the tasks using the user interface. For example, the path detector 108 may determine that events with a compliance (e.g. column 330) greater than or equal to a threshold compliance may be determined common events. For example, the threshold compliance may be 50%. Then for example, the events 1, 2, 3, 4, 6, 7, 8, 9, 10, 13 and 14 may be considered common events as they each include a compliance (e.g. column 330) greater than or equal to 50%.

Then, for example, the path detector 108 may order or sequence the common events. For example, the path detector may sequence the common events as they were recorded. In another example embodiment, the path detector 108 may order the common events based from those with the greatest compliance (e.g. column 330) to the least compliance. Then, a simulator may then provide a simulation or visual representation of the ordered common events for the test administrator to examine. In designing the user interface, the test administrator may have already had in mind a predicted path that he expected a majority of the users to perform. Then for example, the test administrator may provide the predicted path (or predicted sequence of events) to the simulator whereby the test administrator may quickly compare the predicted path to the common path determined based on the aggregation 300.

Figure 4:
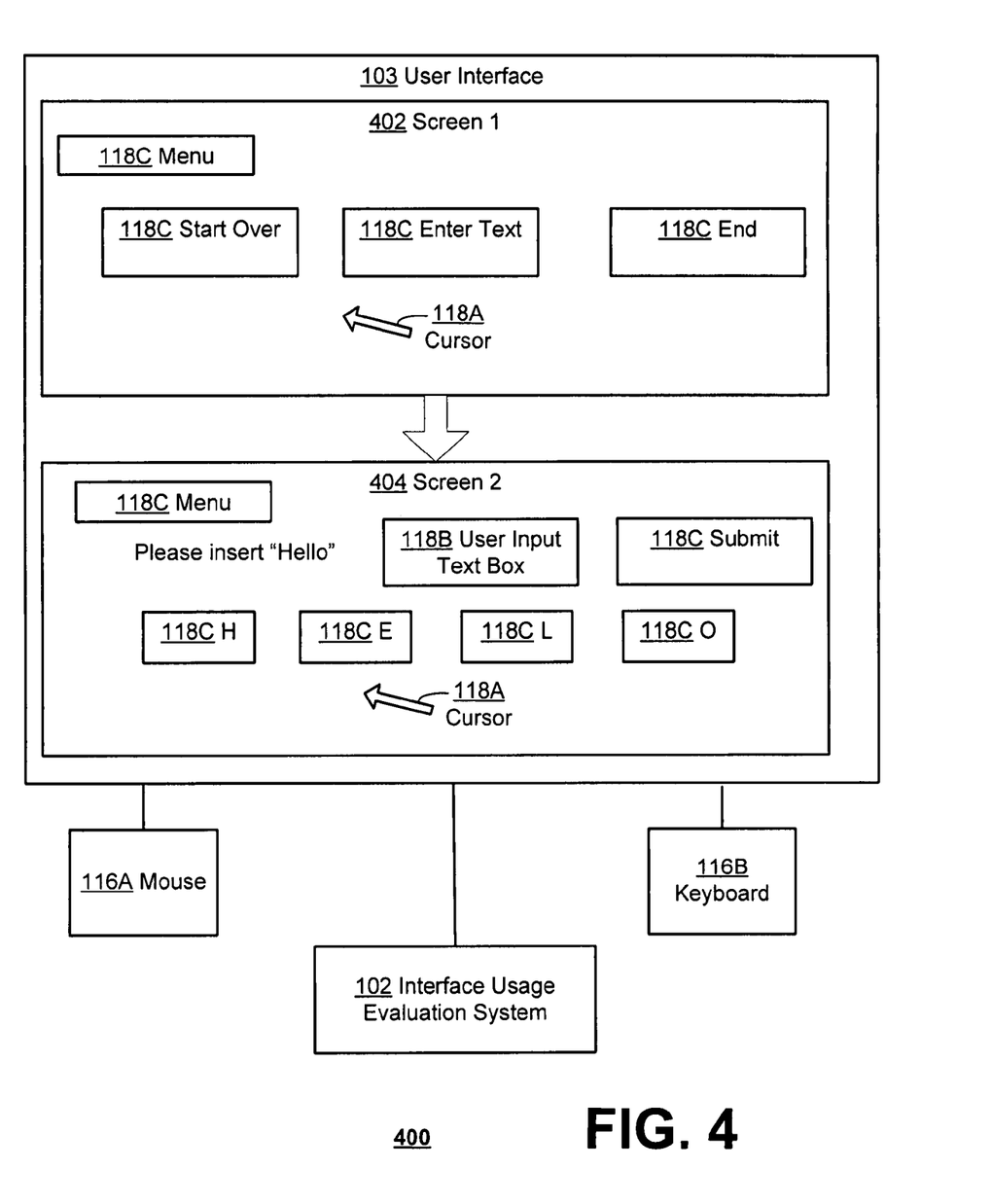
FIG. 4 is a block diagram of an example system for an interface usage evaluation system, according to an example embodiment.

FIG. 4 is a block diagram of an example system 400 for an interface usage evaluation system 102, according to an example embodiment. In the example of FIG. 4, the system 400 may include components that are similar or substantially similar to like numbered components of FIG. 1.

In the system 400, the user interface 103 may include two screens 402 and 404. The screen 402 may include a first or beginning screen that may greet users attempting to use the user interface 103. The screen 404 may include a second or subsequent screen that users using the user interface 103 may navigate to during their use. The screen 402 may include a selectable drop-down menu option 118C, a selectable "Start Over" button 118C, a selectable "Enter Text" button 118C, a selectable "End" button 118C and a cursor 118A. Upon a selection of the "enter text" button 118C, users may be provided the screen 404.

The screen 404 may include a selectable menu 118C, a selectable "H" button 118C, a selectable "E" button 118C, a selectable "L" button, a selectable "O" button 118C, a selectable "Submit" button and a cursor 118A. The screen 404 may also include a user input text box 118B configured to receive keyboard input and/or input from the "H", "E", "L" and "O" buttons 118C.

A user (or users) may then interact with the user interface 103, including the screens 402 and 404, using a mouse 116A and/or a keyboard 116B. For example, a user may move the cursor 118A to "Enter Text" button 118C on the screen 402. Then for example, the user may be provided the screen 404. On the screen 404, the user may be provided the task of inserting "Hello" into the user input text box 118B. To do so, the user may either use the keyboard 116B to type in the letters "hello" and/or use the mouse 116A to use the on-screen buttons "H" "E" "L" and "O" and/or some combination of the two. Then for example, the user may select the "Submit" button.

The interface usage evaluation system 102 may record the interactions as performed by the user (i.e. via the mouse 116A and/or keyboard 116B) and provide a simulation thereof. Similarly, the interface usage evaluation system 102 may record the interactions performed by multiple users, determine common paths and provide one or more simulations thereof.

Figure 5:
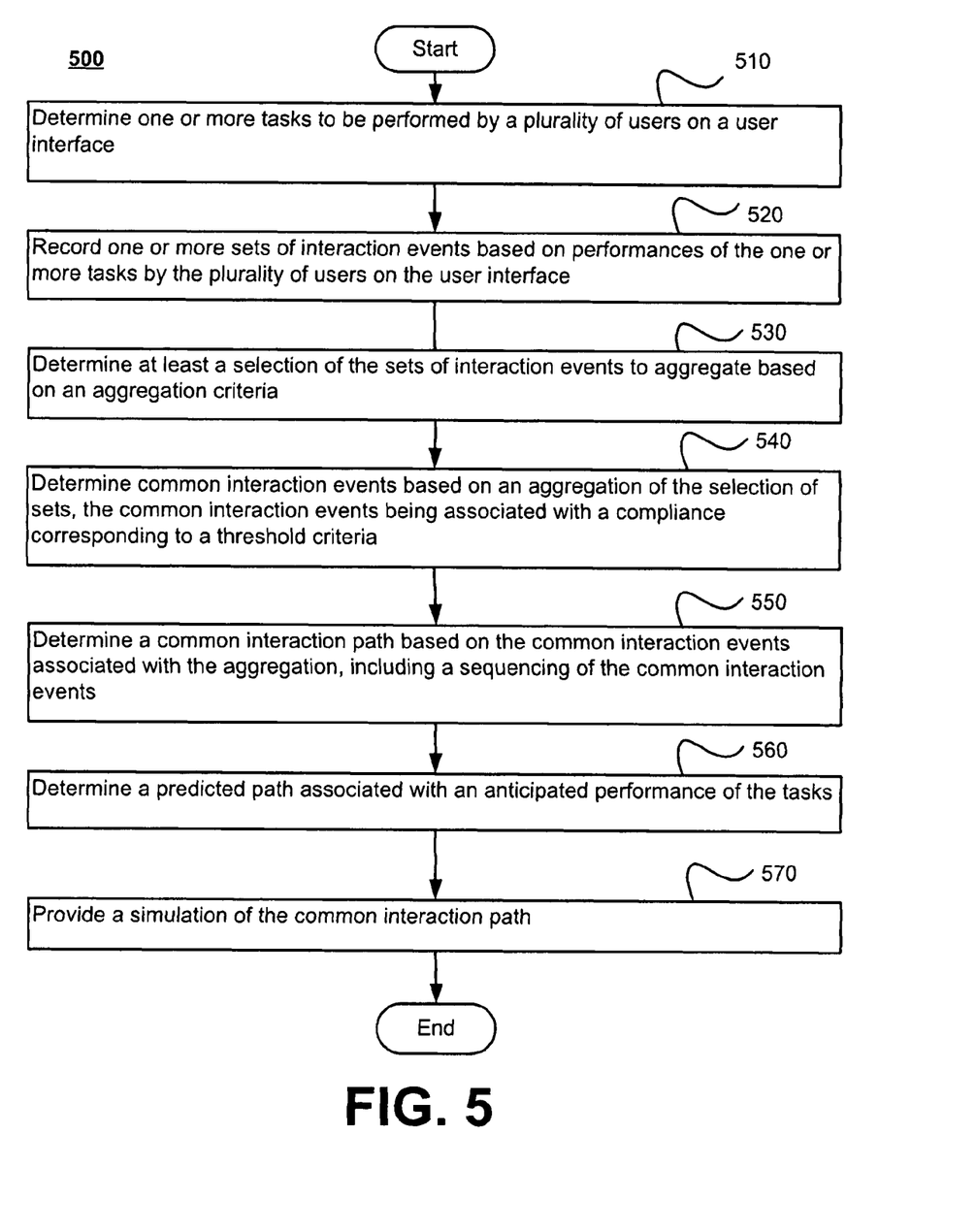
FIG. 5 is a flowchart illustrating example operations of the system of FIG. 1.

FIG. 5 is a flowchart 500 illustrating example operations of the system of FIG. 1. More specifically, FIG. 5 illustrates an operational flow 500 representing example operations related to the evaluation of interface usage.

After a start operation, one or more tasks to be performed by a plurality of users on a user interface may be determined (510). For example, as shown in FIG. 1, the tasks 136 may be provided to the users 104A-C to be performed on the user interface 103.

Then, one or more sets of interaction events may be recorded, based on performances of the one or more tasks by the plurality of users on the user interface (520). For example, the event recorder 105 may record the events 120A-D in the user files 122A and 122B based on the performances of the tasks 136 by the users 104A-C.

Then, at least a selection of the sets of interaction events to aggregate may be determined based on an aggregation criteria (530). For example, the aggregator 106 may determine one or more of the user files (e.g. 122A-B) as stored in the interaction event database 124 to aggregate based on the aggregation criteria 126. Then for example, the aggregator 106 may provide the aggregation 300.

Then, common interaction events based on an aggregation of the selection of sets may be determined, the common interaction events being associated with a compliance corresponding to a threshold criteria (540). For example, the path detector 108 may determine the common interaction events from the aggregation 300 based on a comparison of the compliance 330 to the threshold criteria 126.

Then a common interaction path based on the common interaction events associated with the aggregation may be determined, including a sequencing of the common interaction events (550). For example, the path detector 108 may determine one or more common path(s) 130 based on the common interaction events. The path detector 108 may order or sequence the common events, for example in the order recorded, and store the ordered sequence as common path(s) 130.

A predicted path associated with an anticipated performance of the tasks may be determined (560). For example, the test administrator 134 perform or otherwise provide the predicted path(s) 138 to the interface usage evaluation system 102.

Then a simulation of the common interaction path may be provided (570). For example, the simulator 110 may simulate the common path(s) 130 on the user interface 103 via the display 132. Then for example, the test administrator 134 may quickly view the simulation of the common path(s) 130 without having had to analyze each of the user's 104A-C uses individually, and may compare the performances (as aggregated in the common path(s) 130) to a simulation of the predicted path(s) 138. In doing so, the test administrator 134 may quickly and more easily and cost efficiently make decisions regarding a potential future redesign of the user interface 103.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method of performing user interface usability testing comprising:
    determining a plurality of sets of graphical user interface (GUI) interaction events inputted by a plurality of users, by recording GUI interaction events periodically based upon a predetermined timer, wherein each set of GUI interaction events includes:
        a series of one or more interaction events associated with a usage session of a graphical user interface, and
        at least one GUI interaction event is caused by a user interaction with a displayed GUI element; determining one or more common interaction events among the sets,
    wherein determining a common interaction event includes determining whether or not a GUI interaction event is included by at least a configurable threshold number of the sets of GUI interaction events, and
    wherein not all GUI interaction events are included by the configurable threshold number of the sets of GUI interaction events;
    determining a common interaction sequence wherein the common interaction sequence includes an ordered sequence of the common interaction events; and
    providing a simulation associated with the common interaction sequence wherein providing the simulation includes rendering a visual representation of the common interaction events in the ordered sequence.

2. The method of claim 1, wherein the determining a plurality of sets of GUI interaction events comprises:
    determining one or more tasks associated with the use of the graphical user interface; and
    recording the GUI interaction events as one or more users attempt to perform one or more of the tasks.

3. The method of claim 1, wherein the determining a plurality of sets of GUI interaction events comprises:
    determining a status of one or more user input devices periodically during the use of the user interface.

4. The method of claim 1 wherein the determining a plurality of sets of GUI interaction events comprises:
    recording a GUI interaction event associated with an operation of a user input device during the use of the graphical user interface.

5. The method of claim 1 wherein the determining common interaction events comprises:
    aggregating a plurality of sets of GUI interaction events, where each set of GUI interaction events is associated with a different respective user; and
    determining the common interaction events associated with the plurality of sets based on the mathematical intersection of the aggregation.

6. The method of claim 1 wherein the determining common interaction events comprises:
    aggregating at least a selection of the sets, based on a performance of one or more identified interaction events included by the selected sets, into one or more aggregated sets;
    determining aggregated interaction events included in one or more of the aggregated sets;
    determining a frequency associated with the performance of each of the aggregated interaction events based on the aggregated sets; and
    determining the common interaction events based on a comparison of the frequency associated with each aggregated interaction event to the predetermined threshold.

7. The method of claim 1 wherein the determining common interaction events comprises:
    determining a number associated with how many of the sets of interaction events include one or more identified interaction events;
    making a comparison of the number to the predetermined threshold;
    aggregating at least a portion of one or more of the sets, based at least in part on the comparison; and
    determining, from the aggregation, the common interaction events.

8. The method of claim 1 wherein the determining common interaction events comprises:
    determining that each set includes a plurality of GUI interaction events performed by a plurality of respective users and corresponding to the users completing a task via the graphical user interface; and
    determining the common interaction events among the sets, wherein the common interaction events include only those GUI interaction events included by a majority of the sets and performed by a majority of the users in completing the task.

9. The method of claim 1 wherein the providing the simulation comprises:
    determining an average time associated with a performance of one or more of the common interaction events; and
    rendering a visual representation of the user interface including an automated performance of the common interaction events associated with the common interaction path, based on the average time.

10. The method of claim 1, wherein at least one GUI interaction event includes an absence of user activity in interacting with the GUI.

11. An apparatus for performing user interface usability testing comprising:
    a processor configured to execute machine readable instructions;

an event recorder configured to record, periodically based upon a predetermined timer, graphical user interface (GUI) interaction events associated with a use of a user interface by a plurality of users, and wherein at least one GUI interaction event is caused by a user interaction with a displayed GUI element;

an aggregator configured to aggregate at least some of the GUI interaction events associated with one or more of the users into sets of aggregated interaction events, wherein each set of aggregated interaction events includes a series of interaction events associated with a usage session of a GUI;

a sequence detector configured to determine one or more ordered common interaction sequences including an ordered sequence of common interaction events based on common interaction events associated with at least a configurable threshold number of the sets of aggregated interaction events, wherein not all GUI interaction events are included by the configurable threshold number of sets of GUI interaction events; and a simulator configured to render visual representations of the one or more common interaction sequences with respect to the user interface.

12. The apparatus of claim 11 wherein the event recorder is configured to record the interaction events chronologically.

13. The apparatus of claim 11 wherein the event recorder is configured to periodically record status information associated with the user interface and/or one or more user interface devices.

14. The apparatus of claim 11 wherein the aggregator is configured to aggregate the interaction events associated with the one or more users based on identified features associated with one or more of the interaction events, or sets thereof.

15. The apparatus of claim 11 wherein the simulator is configured to render the common interaction events associated with the one or more common interaction paths with respect to the user interface.

16. The apparatus of claim 11, wherein the event recorder is configured to record GUI interaction events based upon a timer; and wherein at least one GUI interaction event includes an absence of user activity in interacting with the GUI.

17. A computer program product being tangibly embodied on a machine-readable storage device and including executable code that, when executed, is configured to cause a data processing apparatus to perform user interface usability testing, the testing comprising:

determine a plurality of sets of graphical user interface (GUI) interaction events input by a plurality of users, by recording GUI interaction events periodically based upon a predetermined timer, wherein each set of GUI interaction events includes:

a series of one or more interaction events associated with a usage session of a graphical user interface, and at least one GUI interaction event is caused by a user interaction with a displayed GUI element; determine one or more common interaction events among the sets, wherein determining a common interaction event includes determining whether or not a GUI interaction event is included by at least a configurable threshold number of the sets of GUI interaction events, and wherein not all GUI interaction events are included by the configurable threshold number of the sets of GUI interaction events;

determine a common interaction sequence wherein the common interaction sequence includes an ordered sequence of the common interaction events; and provide a simulation associated with the common interaction sequence wherein providing the simulation includes rendering a visual representation of the common interaction events in the ordered sequence.

18. The computer program product of claim 17 wherein the data processing apparatus configured to determine one or more common interaction paths is configured to:

determine the common interaction paths based at least in part on a predicted interaction sequence.

* * * * *